United States Patent [19]

Mann

[11] Patent Number: 4,737,130

[45] Date of Patent: Apr. 12, 1988

[54] GOOSE CALL

[76] Inventor: Sean E. Mann, Rt. 1, Box 184, Easton, Md. 21601

[21] Appl. No.: 894,916

[22] Filed: Aug. 8, 1986

[51] Int. Cl.$^4$ .............................................. A63H 5/00
[52] U.S. Cl. ..................................... 446/207; 446/208
[58] Field of Search ............... 446/207, 208, 209, 202, 446/213, 297

[56] References Cited

U.S. PATENT DOCUMENTS

| | | | |
|---|---|---|---|
| 2,604,731 | 7/1952 | Meucci | 446/208 |
| 2,711,614 | 6/1955 | Halsten | 446/208 |
| 2,730,836 | 1/1956 | Faulk et al. | 446/207 |
| 2,782,558 | 2/1957 | Harley | 446/207 |
| 3,001,322 | 9/1961 | Sanders | 446/207 |
| 3,066,444 | 12/1962 | Dieckmann | 446/207 |
| 4,143,485 | 3/1979 | Stewart | 446/207 |

FOREIGN PATENT DOCUMENTS 479612 12/1951 Canada ................. 446/208

Primary Examiner—Victor N. Sakran
Attorney, Agent, or Firm—Cushman, Darby & Cushman

[57] ABSTRACT

The short mouthpiece of the goose call is provided with a bushing which telescopically mounts in the mouthpiece bore. A relatively long belled tube mounts to the bushing in order to produce a sound-projecting megaphone effect for the instrument. Further, the reed is truncated in comparison with the reed of a conventional reed assembly, to an extent such that the free end of the reed is substantially coincident with the end edge of the sound trough. Percussive sound, as a result of blowing on the mouthpiece to cause the reed to vibrate, consequently is produced primarily by repetitive flapping of the reed aganist the side margins of the mouth of the sound trough, a crisper herr-onk break is more easily achieved, and the tendency of moisture or ice to cause the free end portion of the reed to non-vibratingly adhere to the mouth surface of the sound trough is reduced.

4 Claims, 3 Drawing Sheets

GOOSE CALL

BACKGROUND OF THE INVENTION

The characteristic cry of the goose is "herr-onk" sound, and the abrupt change in sound between its two parts is called its "break".

There is a strong market among people who are goose hunters, goose watchers and goose cry mimics, e.g. for competitors in goose cry mimicry contests, for goose calls, that is for small hand-held instruments which, when mouth-blown or otherwise actuated give out sounds mimicking those of geese. Most popular goose calls are made of wood and/or synthetic plastic resin and most closely resemble a reed-type wind instrument, e.g. an oboe or clarinet, or a recorder, except that few have valves or finger holes. Instead, most are designed to emit a cry with a chracteristic pitch-profile, which is sometimes subject to being raised and lowered by adjustments applied to the reed.

Among devotees of goose cry mimicry, a currently favorite goose call is the Olt 77 made in Pekin, Ill., which can be considered the current conventional standard. This goose call has a tubular mouthpiece which is about four inches long, into one end of the throughbore of which is frictionally telescopically received the small end of a tubular keg that is about 1.25 inches long. The bore of the keg, which is about 0.25 inch in diameter has a reed assembly fitted therein, including a reed applied to the sound-trough side of a reed base and held in one end of the keg bore by a wedge. The wedge holds the base of the reed tight against the reed base at one end of the reed, but leaves the main part of the reed free to flappingly vibrate against the reed base, particularly about the peripheral surface of the mouth of the sound trough. When the keg with its reed assembly in place is mounted to the mouthpiece, the main part of the reed becomes disposed in the bore of the mouthpiece with the free end of the reed pointing towards the free end of the mouthpiece, i.e. towards that end of the goose call which the user places against his or her mouth and blows on in order to mimic the cry of a goose.

The Olt 77 is a fine instrument, as its popularity in the marketplace among devotees of goose cry mimicry gives ample testimony.

However, in the opinion of the present inventor, there are some basic drawbacks to the mechanical design of the Olt 77 goose call, and other conventional goose calls, duck calls and the like which prevent such calls from being effectively used by more people. The drawbacks cause the calls of the conventional mechanical design to be not as durable as is desirable, not as audible as is desirable, and not as easy to use successfully as is desirable. Accordingly, the market has been limited to those who can afford frequent replacement, or who are tinkerers, and those who have especially good breath-control, as well as those to whom it is acceptable to produce a mimicked cry the sound of which will not travel as far, e.g. through a cross-wind, as can the cry of a real goose.

SUMMARY OF THE INVENTION

The short mouthpiece of the goose call is provided with a bushing which telescopicaly mounts in the mouthpiece bore. A relatively long belled tube mounts to the bushing in order to produce a sound-projecting megaphone effect for the instrument. Further, the reed is truncated in comparison with the reed of a conventional reed assembly, to an extent such that the free end of the reed is substantially coincident with the end edge of the sound trough. Percussive sound, as a result of blowing on the mouthpiece to cause the reed to vibrate, consequently is produced primarily by repetitive flapping of the reed against the side margins of the mouth of the sound trough, a crisper herr-onk break is more easily achieved, and the tendency of moisture or ice to cause the free end portion of the reed to non-vibratingly adhere to the mouth surface of the sound trough is reduced.

The principles of the invention will be further discussed with reference to the drawing wherein a preferred embodiment is shown. The specifics illustrated in the drawing are intended to exemplify, rather than limit, aspects of the invention as defined in the claims.

DETAILED DESCRIPTION

Figure 1:
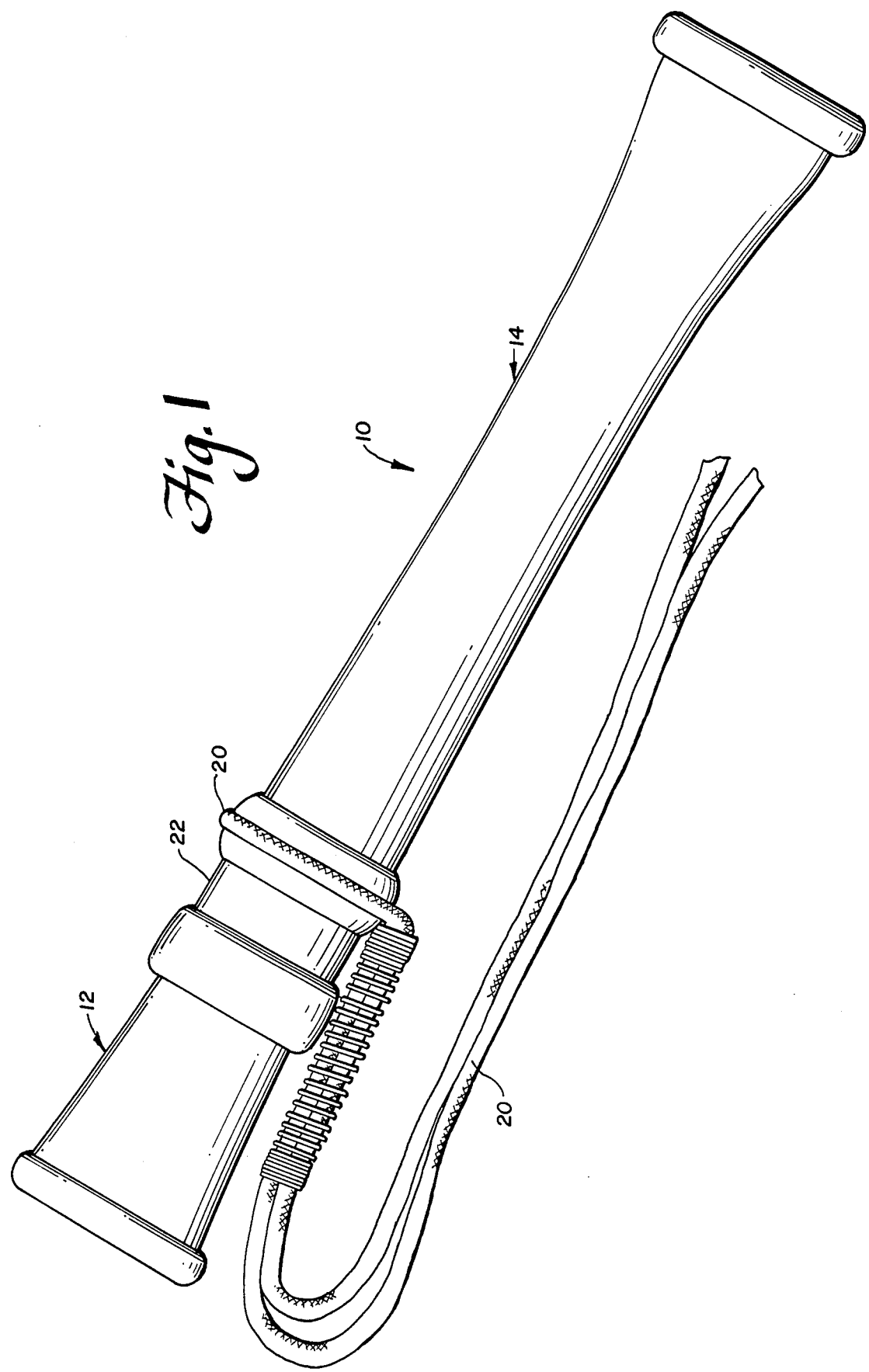
FIG. 1 is a reduced scale side elevational view of a goose call embodying principles of the present invention.
Figure 2:
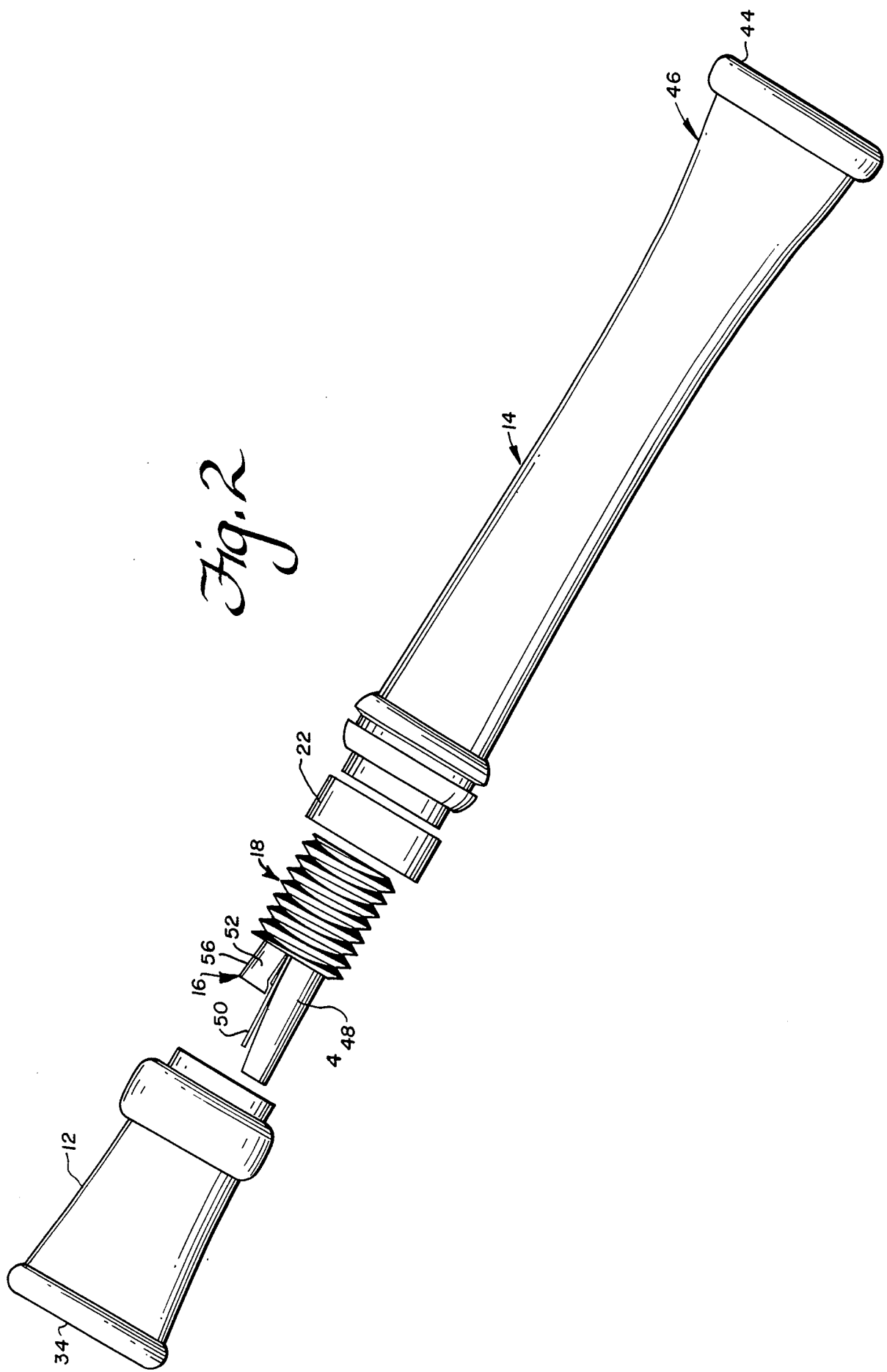
FIG. 2 is an exploded side elevational view thereof with the reed assembly remaining assembled in the bushing.
Figure 3:
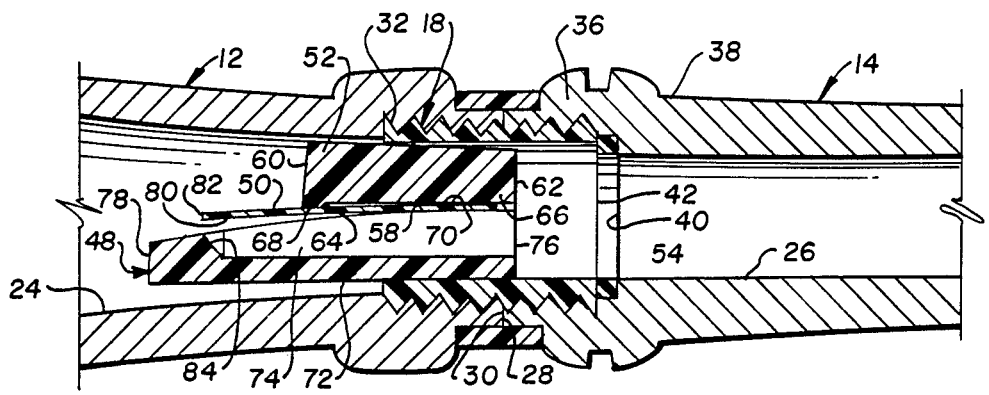
FIG. 3 is a fragmentary, larger scale vertical longitudinal sectional view of the goose call of FIG. 1, showing the reed assembly/bushing/mouthpiece/belled tube relationship.
Figure 4:
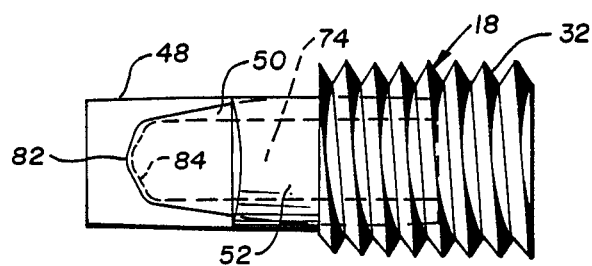
FIG. 4 is a top plan view of the bushing/reed assembly structure shown by itself.
Figure 5:
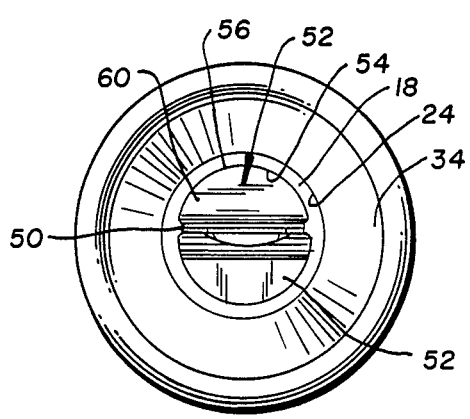
FIG. 5 is a mouthpiece end elevational view of the assembled goose call.
Figure 6:
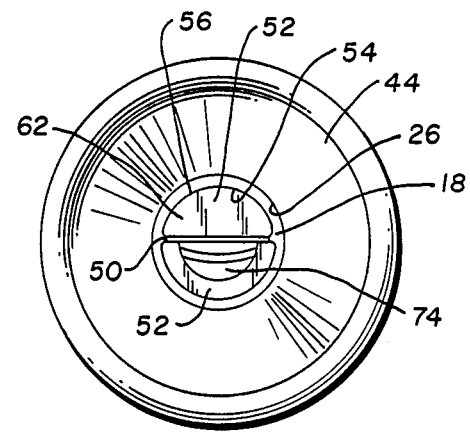
FIG. 6 is a belled tube end elevational view of the assembled goose call.

A presently preferred embodiment of the goose call of the present invention is shown in the drawings at 10.

The goose call 10 has three main parts, namely a tubular mouth piece 12, a belled tube (or tailpiece), 14 and a reed assembly 16, with a bushing 18. Auxiliary parts also shown are a lanyard 20 and a ferrule 22 either or both of which could be dispensed with inasmuch as they are present largely for convenience or decoration rather than because they make any essential contribution to the sound produced by the instrument.

The tubular mouthpiece 12 and the belled tube 14 preferably are made of a lathe-turned exotic wood stock, e.g. birdseye maple, which is lacquered, or stained and lacquered, in order both to provide a finished look and to provide a reasonable degree of moisture resistance. However, these parts could be made of lesser woods and/or of moulded synthetic plastic resin.

Preferably, the mouthpiece 12 is about 2-⅝ inches long and the tailpiece 14 is about 7-½ inches long. These part need not be telescopically related in the assembled instrument 10, but rather be joined by the frictional telescopic receipt of the bushing 18 in both their respective bores 24, 26, with the adjoining ends 28, 30 simply abutting or nearly abutting. The minimum I.D. of the bore 26 of the tailpiece 14 is about ⅜ inch. It is larger near the end 30 by the amount necessary to telescopically frictionally receive the O.D. of the bushing 18. By preference, the bushing 18 is molded, e.g. of nylon, polyethylene or polypropylene and is provided with a plurality of generally circumferentially extending ribs spaced axially from one another, such as external coarse helical threading or a series of similar ring-shaped bosses, dowel pin-type external grooves or the like for facilitating removable telescopic fitting of the bushing in the bores 24, 26. A simple frictional fit of a smooth-surfaced bushing in smooth-surfaced bores would work, but such an instrument would be too easily subject to unintentional disassembly at awkward times. The provision of threading 32 as shown permits the parts 12, 14, 18 to be removably screwed together with the threading preventing simple longitudinal pulling apart of the assembly 12/14/18. In many instances, the threading 32 will be tough and strong enough, compared to the wood of the pieces 12 and 14 that no complementary threading needs to be cut in the bores 24, 26 near the ends 28, 30. Rather, in the course of performing the first assembly of the parts 12/14/18, the threads 32 cut their own complementary threading in the bores 24, 26 by selective compression of the wood fibes in the parts 12 and 14.

The nominal I.D.'s of the bores 24 and 26 at the ends 28, 30, i.e. in the sockets for telescopic receipt of the bushing 18 is about 13/16 inch.

In the mouthpiece 12, the bore remains of this diameter nearly to the free end 34, where a slight flaring is shown provided in order to facilitate holding the instrument agains the user's pursed lips. This flaring is deemed to be not very crucial in longitudinal extent or degree of taper.

In the tailpiece 14, the socket 36 preferably is just long enough to receive the intended proportion of the bushing 18, preferably plus a sealing ring 38 (meant to remain in place against the socket-end shoulder 40 once installed). The ring 38, if provided, may be made of the same material as the bushing 18. In some instances, the bushing 18 can be designed to have its end 42 seat directly against the shoulder 40, thus obviating the need for a separate sealing ring 38. At the place where the shoulder 40 is located, the bore 26 has its smallest diameter, e.g. about ⅝ inch, as aforesaid. From there, and preferably for at least about five inches, the bore 26 maintains its smallest diameter, and then flares to the free end 44, preferably at about a twelve-degree angle, i.e. at at least a 10 degree angle, so as to provide a bell 46. The length of the tailpiece 14, and especially of the long small-diameter portion creates back pressure on the sound waves attempting to emerge from the bell which contributes both a megaphone-like projection to the sound waves, and also contributes to the timbre and amplitude of the sound, to such an extent that the instrument 10 can be distinctly heard from 600 yards away, when blown into a strong cross-wind, and it is the whole of the mimicked cry that can be heard, that is a "herr-onk" and not just an "onk" or "k".

Many competition-oriented goose callers and enthusiasts trying to be especially accurate in their mimicry often will cup their hands or one of them about the air exit of the keg of their goose call and by manipulation of those hands or that hand seek to intensify projection of the mimicked cry. With the belled tube 14, such manual manipulation is not needed for achieving adequate, indeed even superior sound projection, although manual cupping is not precluded should a caller wish to ornament the timbre of his or her calling by such means.

The reed assembly 16, with one important exception (a modification) to be discussed below, may be exactly the same one that is conventionally used on the Olt 77 goose call which is the current industry standard, as mentioned above.

The reed assembly 16 preferably is made of three parts which may be made of synthetic plastic resin, namely a reed base 48, a reed 50 and a wedge 52. The transverse cross-sectional shapes of these elements are such that when they are sandwiched-together as shown, their composite cross-sectional shape at sites along their common length which are meant to be telescopically frictionally grippingly received in the smooth bore 54 of the bushing 18, is substantially circular.

In the example depicted, the reed base 48 is about 1-½ inch long and the wedge 52 is about 1 inch long. The back of the wedge, i.e. the outer peripheral curved surface 56 is cylindrically curved, and the inner surface 58 is generally flat. The wedge 52 is not perfectly semi-cylindrical, however, because the surface 56 is disposed in a plane which extends at an oblique angle to the longitudinal axis of the notional cylinder of which the surface 56 an outer peripheral portion. The larger end 60 of the wedge 52 is more nearly a complete semicircle than is the smaller end 62. In addition, the surface 58 is not utterly flat; rather, it preferably has a slight step at 64, so that when the reed assembly is assembled and wedgingly telescopically fitted into the bore of the bushing 18, the reed is gripped out only at the "heel" 66 of the wedge, within the bore of the bushing 18, but also at the "toe" 68 of the wedge somewhat beyond the bore of the bushing 18. The reed 50 is free to vibrate from where it is compressively gripped between the toe 68 of the wedge and the inner surface 70 of the reed base 48.

The reed base 48 also has an outer peripheral surface 72 which is cylindrically curved, and its inner surface 70 also is generally flat, but the reed base 48 also is not perfectly semi-cylindrical, for two main reasons. Firstly, there is a sound trough 74 cut or otherwise formed in the inner surface 70 through the end 76 and terminating adjacent but short of the opposite end 78, so as to leave a generally U-shaped remainder about the side edges and opposite end edge of the sound trough, i.e. marginally about the perimeter of the mouth of the trough 74, except centrally of the end 76 through which the trough 74 opens. Secondly, the surface 70 while generally flat at and near the end 76, begins to decline on a smooth, increasing-rate declining curve towards the end 78. Accordingly, looking towards the respective end of the reed assembly which equates to looking at the free end of the reed, one can see that beyond the toe of the wedge 52, the face 80 of the free end portion of the reed naturally extends increasingly more distant from the surface 70. It is the repetitive flapping of the free end portion of the reed 50 against the reed base surface 70 that provides at least a major part of the sound which is produced by blowing into the mouthpiece of the device 10.

The reed 50, per se, preferably is made of flat spring-like synthetic plastic sheet material e.g. made of polyvinyl acetate, polyethylene terephthalate or the like.

According to the principles of the present invention, although the reed 50 is wide enough that its two opposite side marginal portions are positioned to slap against the corresponding side marginal portions of the surface 70, the free end 82 of the reed 50 is trimmed back so that its edge is substantially coincident with the corresponding end edge 84 of the sound trough 74. That is, there is a minimal, if existant, overlap (or gap) between the reed end 82 and the surface 70 relative to the end edge 84 of the sound trough 74 when in use of the instrument, the reed 50 is resiliently slapped repeatedly into facewise contact with the surface 70. I have found that as a result of this relative truncation of the reed (which is contrary to the corresponding element-to-element relationship in the Olt 77 reed assembly) the reed break (from "herr" to "onk") is more natural and more easily achieved even by persons having less experience in goose calling, and this reed will not nearly so easily stick down or freeze down due to effects of moisture trapped between the reed and the mouth of the sound trough 74. The reed 50 preferably is of conventional thickness, e.g. as used in an unmodified Olt 77 reed assembly. The free end portion of the reed typically is one-half inch long, when the opposite, captive end of the reed is flush with the ends of the reed base and wedge between which that portion of the reed is sandwiched.

A bonus which is achieved by telescopically frictionally mounting the reed assembly in a plastic bushing rather than directly in the wooden tailpiece is that pitch change and/or cracking due to the effect of moisture from the user's breath on the wood is significantly reduced or prevented altogether.

If desired or considered necessary additional sealant of a flowable type such as rubber cement can be used for additional gasketing, e.g. between the outer periphery of the capitve circular-sectioned sandwich of the reed assembly and the inner peripheral surface of the through bore of the bushing 18.

It should now be apparent that the goose call as described hereinabove, possesses each of the attributes set forth in the specification under the heading "Summary of the Invention" hereinbefore. Because it can be modified to some extent without departing from the principles thereof as they have been outlined and explained in this specification, the present invention should be understood as encompassing all such modifications as are within the spirit and scope of the following claims.

What is claimed is:

1. A goose call, comprising:
   a tubular mouthpiece having a longitudinal bore;
   a tubular tailpiece having a longitudinal bore;
   an annular bushing having a longitudinal bore;
   a reed assembly comprising a flexible reed sandwiched between a reed base and a wedge throughout corresponding portions thereof, said reed being effectively longer than said wedge, and said reed base being effectively longer than said reed, said reed base having a generally flat inner surface in which a sound trough is formed so as to open through one end of said reed base, but to terminate at an end which is short of an opposite end of said reed base, whereby said generally flat inner surface is generally U-shaped in plan view, said reed having a free end portion extending beyond said wedge and leading to a free end, which free end portion is adapted normally to stand free of said generally flat inner surface of said reed base but to slap repeatedly thereagainst when vibrated, said free end of said reed extending axially beyond said wedge at least substantially to said end of said sound trough and being substantially coterminous with said end of said sound trough;
   said reed assembly having said corresponding portions of said reed base, reed and wedge thereof telescopically received in said longitudinal bore of said annular bushing, thereby maintaining said reed assembly assembled and blocking airflow axially past said annular bushing internally of said annular bushing except through said sound trough;
   said annular bushing being telescopically received in both said longitudinal bore of said tubular mouthpiece and said longitudinal bore of said tubular tailpiece at axially aligned adjacent ends of said tubular mouthpiece and tubular tailpiece;
   securement means releasably securing said tubular mouthpiece and said tubular tailpiece together against axial detelescoping of said tubular mouthpiece and said tubular tailpiece from said annular bushing, and
   said tailpiece providing a belled tube having a throat for said free end portion of said reed, which throat is at least five inches in length.

2. The goose call of claim 1, wherein:
   said annular bushing is made of molded synthetic plastic resin.

3. The goose call of claim 2, wherein:
   said annular bushing is externally provided with at least generally circumferentially extending ribs spaced axially, from one another for interference fitting in said throughbores of at least one of said tubular mouthpiece and said tubular tailpiece for providing at least part of said securement means.

4. A goose call, comprising:
   a tubular mouthpiece having a longitudinal bore;
   a tubular tailpiece having a longitudinal bore;
   an annular bushing having a longitudinal bore;
   a reed assembly comprising a flexible reed sandwiched between a reed base and a wedge throughout corresponding portions thereof, said reed being effectively longer than said wedge, and said reed base being effectively longer than said reed, said reed base having a generally flat inner surface in which a sound trough is formed so as to open through one end of said reed base, but to terminate at an end which is short of an opposite end of said reed base, whereby said generally flat inner surface is generally U-shaped in plan view, said reed having a free end portion extending beyond said wedge and leading to a free end, which free end portion is adapted normally to stand free of said generally flat inner surface of said reed base but to slap repeatedly thereagainst when vibrated, said free end of said reed extending axially beyond said wedge at least substantially to said end of said sound trough and being substantially coterminous with said end of said sound trough;
   said reed assembly having said corresponding portions of said reed base, reed and wedge thereof telescopically received in said longitudinal bore of said annular bushing, thereby maintaining said reed assembly assembled and blocking airflow axially past said annular bushing internally of said annular bushing except through said sound trough;
   said tubular mouthpiece and said tubular tailpiece being disposed in axial alignment with one another, each with an end disposed adjacent an end of the other and disposed so that said longitudinally bore of said tailpiece and said longitudinal bore of said mouthpiece together form respective portions of a longitudinal bore for said goose call;
   said annular bushing being coaxially disposed and mounted in said longitudinal bore of said goose call adjacent said end of said tubular mouthpiece and said end of tubular tailpiece so as to block airflow axially past said annular bushing in said longitudinal bore of said goose call except through said sound trough;

securement means releasably securing said tubular mouthpiece and said tubular tailpiece together whereby access may be gained to said reed assembly by disassembly of said tubular tailpiece from said tubular mouthpiece by releasing securement provided by said securement means; and said tailpiece providing a belled tube having a throat for said free end portion of said reed, which throat is at least five inches in length.

* * * * *